US009349047B2

(12) United States Patent
Fiorini et al.

(10) Patent No.: US 9,349,047 B2
(45) Date of Patent: May 24, 2016

(54) METHOD FOR THE OPTICAL IDENTIFICATION OF OBJECTS IN MOTION

(75) Inventors: Daniele Fiorini, Casalecchio di Reno (IT); Ricky Darrell Owen, Morning View, KY (US); Luigi Pellegrino, Nardò (IT)

(73) Assignee: Datalogic IP Tech S.r.l., Lippo di Calderara di Reno (Bologna) (IT)

( * ) Notice: Subject to any disclaimer, the term of this patent is extended or adjusted under 35 U.S.C. 154(b) by 117 days.

(21) Appl. No.: 14/001,744

(22) PCT Filed: Feb. 20, 2012

(86) PCT No.: PCT/IB2012/000324
§ 371 (c)(1),
(2), (4) Date: Oct. 2, 2013

(87) PCT Pub. No.: WO2012/117283
PCT Pub. Date: Sep. 7, 2012

(65) Prior Publication Data
US 2014/0029796 A1 Jan. 30, 2014

(30) Foreign Application Priority Data
Feb. 28, 2011 (IT) .............................. MI2011A0307

(51) Int. Cl.
*G06K 9/00* (2006.01)
*G06K 7/10* (2006.01)

(52) U.S. Cl.
CPC ........ *G06K 9/00624* (2013.01); *G06K 7/10861* (2013.01)

(58) Field of Classification Search
CPC ........... G06K 7/10861; G06K 9/00624; G01B 11/04; G01N 2021/845
See application file for complete search history.

(56) References Cited

U.S. PATENT DOCUMENTS

| 6,281,795 | B1* | 8/2001 | Smith et al. | 340/572.1 |
| 7,561,717 | B2* | 7/2009 | Anderson | 382/101 |
| 7,636,483 | B2* | 12/2009 | Yamaguchi et al. | 382/239 |

(Continued)

FOREIGN PATENT DOCUMENTS

| EP | 851376 A1 | 7/1998 |
| EP | 1363228 A2 | 11/2003 |
| WO | WO2008078129 A1 | 7/2008 |

OTHER PUBLICATIONS

International Search Report and Written Opinion dated Apr. 13, 2012 in corresponding International Application No. PCT/IB2012/000324.

*Primary Examiner* — Bhavesh Mehta
*Assistant Examiner* — Ian Lemieux
(74) *Attorney, Agent, or Firm* — Duane Morris LLP

(57) ABSTRACT

The method includes the steps of acquiring, by at least one camera having a predetermined magnification ratio, at least one image containing at least one coded information and at least one object and properly associating the coded information with the at least one object on the basis of the position of the coded information and of the at least one object along an advancing direction with respect to a fixed reference system. The above-mentioned position of the coded information is determined starting from the position of the coded information within the image acquired by the camera and on the basis of the distance of the coded information from the camera. Such a distance is in turn determined on the basis of the magnification factor of a reference physical dimension detected at a surface of the object or of the coded information.

19 Claims, 8 Drawing Sheets

(56) References Cited

U.S. PATENT DOCUMENTS

| | | |
|---|---|---|
| 2003/0142211 A1 | 7/2003 | Stamm |
| 2003/0206305 A1* | 11/2003 | Gagliano ...................... 356/601 |
| 2006/0076415 A1* | 4/2006 | Reichenbach et al. ........ 235/454 |
| 2009/0039157 A1* | 2/2009 | Reichenbach et al. ........ 235/436 |
| 2009/0048705 A1* | 2/2009 | Nubling et al. ................ 700/228 |
| 2009/0095600 A1 | 4/2009 | Reichenbach et al. |
| 2010/0045701 A1* | 2/2010 | Scott et al. .................... 345/633 |

* cited by examiner

METHOD FOR THE OPTICAL IDENTIFICATION OF OBJECTS IN MOTION

BACKGROUND AND SUMMARY OF THE INVENTION

The present invention relates to a method for the optical identification of objects in motion.

Throughout the following description and the following claims, the expression: "optical identification" is used to indicate the acquisition and reading of coded information of an object (for example distance, volume, overall dimensions, or object identification data) for example through the acquisition and processing of a light signal diffused by the same object. The term: "coded information" is preferably used to indicate the whole identification data contained in an optical code. The term: "optical code" is used to indicate any graphical representation having the function of storing said coded information.

A particular example of optical code consists of the linear or two-dimensional codes, wherein the information is coded through suitable combinations of elements with a predetermined shape, for example squared, rectangular or hexagonal, of dark colour (usually black) separated by clear elements (spaces, usually white), such as barcodes, stacked codes, two-dimensional codes in general, colour codes, etc. The term "optical code" further comprises, more generally, also other graphical patterns with information coding function, including clear printed characters (letters, numbers, etc.) and special patterns (such as stamps, logos, signatures, fingerprints, etc.). The term "optical code" also comprises graphical representations which are detectable not only in the field of visible light but also in the range of wavelengths comprised between infrared and ultraviolet.

For the sake of making the following explanation easier, explicit reference to linear and two-dimensional codes shall be made hereinafter.

Systems for conveying and sorting packs, luggage and more in general, objects, are commonly used in the field of transports and logistics. In these systems, the objects are placed on a conveyor belt in motion and sorted on the basis of the reading of an optical code printed on a label associated with each object.

In the past, when there were only linear codes, reading the optical codes was carried out by scanning a laser light beam emitted by a dedicated laser reader onto the optical code.

With the coming of two-dimensional codes, the use of digital cameras typically using CCD/CMOS sensors has become widespread. Such cameras allow a greater usage flexibility. Indeed, they are capable of reading both traditional linear codes and two-dimensional codes, as well as other types of codes, besides offering additional functions such as OCR (optical character recognition).

A problem in object conveying and sorting systems is that of distinguishing objects that may even be very close to each other, so as to associate each object with the content of the corresponding optical code.

In those systems using laser readers, the problem of the correct association between object and respective code is solved for example by a system of the type described in EP 0 851 376 and EP 1 363 228. In such system, the laser reader that performs the scanning for reading the optical code also measures the distance and the angular position of the optical code within the scanning, thus providing the polar coordinates of the optical code with respect to the reader. The position of the optical code in the space with respect to a fixed reference system is obtained from these data, the position of the reader with respect to such a fixed reference system being known. A photocell barrier or other outside sensor provides an object presence signal. The temporal advancing of the object with respect to the signal of entry within the field of view of the laser reader is obtained from a further signal provided by an encoder associated with the conveyor belt. The position of the object along the advancing direction is obtained from these data. The association of the code with the respective object is made on the basis of the comparison between the positions of the optical code and of the objects along said advancing direction.

The Applicant has noted that the problem of the proper association code—object occurs in a particularly critical manner in systems using digital cameras. Indeed, digital cameras have a two-dimensional field of view that is typically much wider than that of laser readers. Accordingly, a condition wherein there are multiple objects and multiple optical codes within an image acquired by a digital camera may frequently occur.

The Applicant has noted that in systems that use digital cameras situations may occur in which, in order to carry out the proper association between optical code and respective object, it is necessary to have an information about the distance at which the objects are with respect to the cameras.

In order to better understand this aspect, let us consider for example the situation shown in the annexed FIGS. 1A and 1B.

Such figures schematize a case wherein a camera T detects the presence of two objects K and K-1 within the field of view V thereof and reads an optical code C at the inlet end of the field of view V with reference to the advancing direction A of objects K and K-1. FIG. 1A shows a possible situation wherein object K has a greater height than that of object K-1 and such as to at least partly hide object K-1 right at the inlet end of the field of view V. FIG. 1B, on the other hand, shows a possible situation wherein object K has such a height as not to hide object K-1. The comparison between the two figures shows that it is necessary to have an information about the height of objects K and K-1 for determining which one of the two objects K and K-1 should be associated with the optical code C. Indeed, in the case of FIG. 1A, the optical code C should be associated with object K since even if object K-1 had an optical code at the inlet end of the field of view V, it would not be visible by camera T as it would be hidden by object K. On the contrary, in the case of FIG. 1B, the optical code C shall be associated with object K-1.

The Applicant has found that a very simple and effective way for implementing a technique for measuring the distance in a system that uses digital cameras is to use a height detector (such as for example the one used in EP 0 851 376 and EP 1 363 228), comprising for example a photocell barrier.

An exemplary embodiment of such a system is shown in FIG. 2. This system, globally indicated with reference numeral 10, comprises a conveyor belt 1 which moves a plurality of objects 3 along a direction A with respect to a camera 2, each object 3 being provided with an optical code (non visible). Camera 2 frames a field of view 4 shaped as a pyramid. A processing unit 5, which is connected to the camera 2, is capable of decoding the optical codes associated with objects 3 when these are within the field of view 4. The processing unit 5 further receives a signal of arrival of objects 3 and the respective height from a presence/height sensor 6 arranged upstream of the camera 2 with reference to the feeding direction A of objects 3. Based also on the knowledge of the feeding speed, which is substantially deemed as being constant or measured in real time by an encoder 7 associated with the conveyor belt 1, the processing unit 5 is capable of synchronising the image acquisition by camera 2 with the instant at which each detected object 3 travels through the field of view 4. It is therefore possible to associate an optical code having a predetermined position along the feeding direction A at a certain instant with an object 3 having the same position at the same instant, such association being made on the basis of the height signal provided by the presence/height sensor 6.

Throughout the present description and following claims, the term "height" is used to refer to the distance from the camera through which the presence of objects and/or coded information is detected. The term "height" shall therefore comprise both a distance along a vertical direction (or along a direction having at least one component in the vertical direction) when said camera is arranged above the conveyor belt on which the objects are arranged so that the vertical projection thereof falls right onto the conveyor belt, and a distance along a horizontal direction (or a direction having at least one component in the horizontal direction) when said camera is arranged on the side of, in front of or behind the conveyor belt or above the latter but laterally displaced, forward or backward, so that the vertical projection thereof does not fall onto the conveyor belt. For this reason, the term "height" and the more generic term "distance" shall be used without distinction.

The information about object presence and object height may be provided by specific sensors (respectively presence sensor and height sensor) or by the height sensor only, which is in fact capable of also acting as a presence sensor.

In an alternative embodiment to that described above, the distance information is provided by a distance measuring device integrated with the camera and connected thereto at a geometrically defined position. In this case it is possible to use, for example, a laser reader of the type described in EP 0 851 376 and EP 1 363 228. As an alternative, a laser pointer may be used, the laser pointer being of the static beam type capable of measuring the flight time or the phase shift between the emitted and the reflected laser signal, such as for example the laser distance measuring device S80 marketed by Datalogic Automation.

According to a further alternative embodiment, the distance information is provided by a light pattern projector, for example a laser projector capable of producing a structured light beam, for example a pair of converging or diverging light figures or lines. The object distance may be obtained from the distance between said two lines or figures, said distance being measured in pixels on the image acquired by the camera, and by using a suitable look-up table (obtained empirically or starting from a formula that corresponds to the implementation of the geometrical model of the deformation to which the light beam is subjected), stored into the processing unit. This operation may be carried out at the same time as the image acquisition by the camera.

The projector may also be a single one for multiple cameras, provided that the position and the shape of the pattern projected at the various distances are known for the field of view of each camera, for example by using said look-up table.

A projector of the type described above may also allow the detection of information about shape, position and footprint of the objects travelling through the field of view directly onto the image acquired, by analysing the deformation of a dedicated reference reticule.

A further alternative embodiment provides for the use of a stereo camera, that is a particular type of camera provided with two or more lenses and a separate image sensor for each lens. Such camera is capable of simulating the human binocular vision and thus capturing three-dimensional images (this process is known as stereo photography). Stereo cameras may actually be used for producing stereoscopic views or three-dimensional images for movies or for producing images containing the object distance information (range imaging).

The Applicant has noted that while all the solutions described above are suitable for allowing a proper code-object association, they provide for the distance information to be obtained through the use of an additional device to be associated with the camera, or to be mounted within the camera. This clearly involves an increase in costs and a complication of the installation operations.

The Applicant has therefore considered the problem of finding further solutions adapted to implement, in systems that use digital cameras, a distance measurement technique that would not require the use of additional devices, so as to carry out a proper and effective code-object association without an increase in costs and/or installation burdens.

The Applicant has found that a solution to the above problem could be provided by the use of a TOF camera (where TOF is the acronym of "time-of-flight") having such an optical resolution as to allow a reliable reading of the optical codes. In fact, TOF cameras are capable of providing an object distance information on the basis of the time elapsed between the emission of a light pulse and the reception of the signal backscattered by the object.

However, the Applicant has noted that to date, TOF cameras do not allow a reliable reading of optical codes due to the reduced optical resolution thereof. Such solution will therefore be able to be actuated only when TOF cameras with optical resolutions sufficient for the purpose will be available.

Another solution found by the Applicant provides for the application of a logo of known dimensions on a conveyor belt and the application of an identical logo on the objects. From the comparison of the dimensions of the two logos in the images acquired by the camera with the actual dimensions of said logos it is possible to deduce the distance between object and camera, without in this case requiring the magnification ratio of the camera to be known.

The Applicant wanted to find a further way for solving the problems related to the implementation, in systems that use digital cameras, of a distance measurement technique which should not require the use of additional devices, and found, as a further valid solution, the invention described hereinafter.

Such invention relates to a method for the optical identification of objects in motion, comprising the following steps:

acquiring, by at least one camera having, at least during such an acquisition, a respective predetermined magnification ratio, at least one image of a predetermined detection area, said at least one image containing at least one portion of at least one object travelling through the detection area along a predetermined advancing direction;

determining the position of said at least one portion of said at least one object along the predetermined advancing direction with respect to a predetermined reference system;

detecting, in said at least one image or in at least one subsequent image containing said at least one portion of at least one object, at least one coded information travelling through the detection area along the predetermined advancing direction, said detection being carried out, respectively, by said at least one camera or by a distinct camera having a predetermined relative position with respect to said at least one camera and, at least during the acquisition of said at least one image or of said at least one subsequent image, a respective predetermined magnification ratio;

reading said at least one coded information;
determining the position of at least one portion of said at least one coded information along the predetermined advancing direction within the image;
detecting, by said at least one camera or said at least one distinct camera, at least one reference physical dimension belonging to at least one surface portion of said at least one object or of said at least one coded information;
determining the distance of said at least one surface portion from said at least one camera and, if provided, from said at least one distinct camera on the basis of said at least one reference physical dimension and of the magnification ratio of the camera by which said at least one reference physical dimension has been detected;
determining the position of said at least one portion of coded information along the predetermined advancing direction with respect to the predetermined reference system on the basis of said distance and of the position of said at least one portion of said at least one coded information along the predetermined advancing direction within the image;
associating said at least one coded information with a respective object travelling through the detection area when said at least one coded information is detected, said association being made on the basis of said position of said at least one portion of said at least one object with respect to the predetermined reference system and of said position of said at least one portion of said at least one coded information with respect to the predetermined reference system.

Advantageously, the Applicant has found that the method of the present invention allows carrying out, in a system for the optical identification of objects in motion through digital cameras, the correct code-object association on the basis of a distance reading that only results from the analysis of the image acquired by the camera, that is without the need of using additional devices other than a conventional camera.

In particular, referring for simplicity of explanation to the case in which the optical identification system comprises a single camera, the Applicant has noted that, one reference physical dimension being known or determined (as described hereinafter) on a surface of the object, or the coded information, and the magnification ratio of the imaging sensor mounted in the camera being known, it is possible to determine the distance of said surface from said camera. By using this distance information in combination with the one relating to the position of the coded information along the advancing direction of the objects within the image acquired by said camera, it is possible to determine the position of the coded information along the advancing direction with respect to a fixed reference system. It is therefore possible to proceed with assigning said coded information to the object that, at the time of the acquisition of the image containing the coded information by the camera, is in a corresponding position.

If the optical identification system comprises more than one camera, once the relative position of these cameras in the fixed reference system and the respective magnification ratios are known, it is possible to determine the distance of the object from all the above cameras through the measurement technique described above.

According to the present invention, the image by which the presence of the coded information is detected may also differ from the image by which the object travelling is detected. Moreover, the camera by which the image containing the coded information is acquired may also be different from the one by which the image containing the travelling object is acquired.

If the detection of the travelling object and of the coded information is carried out through distinct cameras, all these cameras have a respective magnification ratio that may be constant or variable over the time, in this latter case it being sufficient to know the extent of said magnification ratio at the time of the acquisition of the respective image. It is therefore possible to determine the position of what framed by the camera with respect to said fixed reference system.

If the magnification ratio of the camera(s) is variable, as in the case of an autofocus/zoom system, the extent of such magnification ratio is determined by a proper processing unit of the identification system discussed herein (such processing unit being incorporated or not within the camera but in any case associated with the latter) on the basis of the focusing position of the autofocus/zoom system at the time of the acquisition.

According to the present invention, if the objects that travel through the detection area are arranged so as to be spaced from each other along said advancing direction, said reference physical dimension may be defined without distinction on the object or on the coded information. In this case, therefore, the determination of the object distance from the camera does not necessarily require the previous detection of a coded information.

On the other hand, if the objects are at least partly arranged side by side with reference to said advancing direction, said reference physical dimension is defined on the coded information.

The detection of said reference physical dimension may also take place before the object or coded information enters the detection area framed by the camera(s) of the identification system discussed herein.

In a first preferred embodiment of the method of the present invention, which may be carried out if the objects that travel through the detection area are arranged so as to be spaced from each other with reference to said advancing direction, the step of detecting said at least one reference physical dimension comprises the steps of:
determining the displacement of said at least one object along said advancing direction;
determining the maximum size of said at least one object along said advancing direction on the basis of said displacement.

In this case, therefore, the reference physical dimension is directly taken on the object and advantageously corresponds exactly to the maximum size of the object along the advancing direction.

If the advancing speed of the object is constant, said displacement may be determined using a presence sensor (for example a photocell). In that case, such displacement corresponds to the time interval between the moment at which the sensor indicates the beginning of the object entry within an observation area and the moment at which the presence sensor indicates the end of the object entry within said observation area. Such observation area may precede, coincide or be at least partly overlapped to the detection area framed by the camera(s) of the optical identification system discussed herein.

If the advancing speed of the object is not constant, said displacement may be determined using, besides a presence sensor, an encoder provided with a proper incremental counter. In that case, the number of unit steps of the encoder is counted by the incremental counter starting from the moment at which the presence sensor indicates the passage of the object. Each counter increase in fact corresponds to a physical displacement of the object along the advancing direction.

Preferably, the step of determining the maximum size of said at least one object along said advancing direction comprises the following steps:
- determining the position of a first significant contrast variation along said advancing direction within said at least one image;
- determining the number of pixels of said at least one image of said at least one camera occupied by said at least one object on the basis of the position of said first significant contrast variation.

Advantageously, the position of said first significant contrast variation may be determined on the basis of the object entry signal provided by said presence sensor, optionally combined with the signal provided by said encoder (if the object advancing speed is not constant).

In any case, once the number of pixels of the image occupied by the object has been determined, it is possible to determine, through the magnification ratio of the camera, the distance at which the object is with respect to the camera itself.

More preferably, the images are acquired so that they entirely contain said at least one object. In that case, the step of determining the maximum size of said at least one object along said advancing direction comprises the following steps:
- determining the position of a first significant contrast variation and of a last significant contrast variation along said advancing direction within said at least one image;
- determining the number of pixels of said at least one image occupied by said at least one object on the basis of the positions of said first significant contrast variation and said last significant contrast variation.

In this way, the determination of the maximum size of the object along the advancing direction is simpler and more immediate to be carried out.

In a different embodiment of the method of the present invention, said at least one reference physical dimension is defined by a known dimension of a logo or different graphical element applied onto the object.

In a second preferred embodiment of the method of the present invention, which does not necessarily require the objects that travel through the detection area to be arranged so as to be spaced from each other with reference to the advancing direction, the detection of said at least one reference physical dimension comprises the steps of determining the physical dimension of said at least one coded information along at least one characteristic direction, said at least one coded information having a predetermined optical resolution.

In this case, therefore, the reference physical dimension is taken on the coded information and advantageously corresponds to the length of the coded information along at least one predetermined direction.

Throughout the present description and the following claims, the expression "predetermined optical resolution" is used to indicate an optical resolution of known extent given by a single value corresponding to an expected resolution or by a range of values within such a tolerance range as to cause a positioning error of the coded information smaller than the minimum admissible distance between two adjacent objects.

As shall appear more clearly from the following description, in preferred embodiments of the method of the present invention said coded information is an optical code having a predetermined optical resolution and/or belonging to a predetermined symbology. In that case, said characteristic direction is the direction along which the elements (or information characters) of the optical code follow one another.

Advantageously, the Applicant has observed that by previously setting the value (or range of values) of said optical resolution and the magnification ratio of the imaging sensor mounted in the camera(s) it is possible to determine the distance of the coded information from the camera(s) on the basis of the comparison between the actual known dimensions and the dimensions in the image acquired by the camera(s).

Preferably, said predetermined optical resolution, if variable, varies by ±15%, more preferably by ±5% with respect to a predetermined reference value.

Preferably, the step of determining the physical dimension of said at least one coded information comprises the following steps:
- determining the position of a first significant contrast variation along said at least one characteristic direction;
- determining the number of pixels of said at least one image of said at least one camera or of said at least one distinct camera occupied by said coded information starting from the position of said first significant contrast variation and on the basis of said predetermined optical resolution.

Advantageously, by counting the number of pixels of the image occupied by said coded information it is possible to determine, through the magnification ratio of the camera, the distance at which the coded information is with respect to the camera itself.

More preferably, the images are acquired so that they entirely contain said at least one coded information. In that case, the step of determining the physical dimension of said at least one coded information preferably comprises the following steps:
- determining the position of a first significant contrast variation and of a last significant contrast variation along said at least one characteristic direction;
- determining the number of pixels of said at least one image of said at least one camera or of said at least one distinct camera occupied by said coded information starting from the positions of said first significant contrast variation and of said last significant contrast variation and on the basis of said predetermined optical resolution.

In this way, the determination of the physical dimension of the coded information along the advancing direction is simpler and more immediate to be carried out.

Preferably, the step of determining the physical dimension of said at least one coded information comprises the step of measuring at least one element of said optical code along said at least one characteristic direction.

In particular, if said at least one coded information is a linear optical code (that is, a code whose elements extend along a single direction), the step of determining a physical dimension of said at least one coded information comprises the step of determining the dimension of said optical code along said single direction. On the other hand, if said at least one coded information is an optical code whose elements extend along at least two predetermined orthogonal directions (for example a two-dimensional code or other types of code), the step of determining a physical dimension of said at least one coded information comprises the step of determining the dimension of said optical code along at least one of said at least two predetermined orthogonal directions.

Advantageously, the Applicant has noted that the types and the optical resolutions of the optical codes used in the object sorting systems are known and in any case limited. Therefore, the physical dimension of the optical code along a predetermined direction (in the case of linear codes) or along two predetermined orthogonal directions (in the case of two-dimensional codes or other types of code) is substantially constant (if the number of elements of the optical code is constant) or in any case a function of said number of information characters (if such number is variable). The physical dimensions of the optical code therefore are either known in advance (if the number of elements of the optical code is constant) or they may be determined upon reading of the same optical code (if the number of elements of the optical code is variable). It is therefore possible to determine the physical dimension of the code along the advancing direction through the measurement of at least one element of such optical code along a predetermined characteristic direction.

In any case, an analysis of the type described above is especially advantageous since the physical dimensions of the optical code or part thereof do not depend on the printing quality and can therefore be previously set on the system.

If the reference physical dimension is taken on the optical code, the above-mentioned contrast variations are defined by the first and/or last element of the code along a predetermined direction or by the opposite sides of an optional frame inside of which the code elements are. If said frame exists, it may be detected and measured once the coded information has been read and the characteristic direction of the optical code has been determined (through a suitable software). The physical dimensions of the optical code may therefore be obtained from the distance between the first element and the last element of the optical code along a respective direction, or from the distance between the two quiet zones often provided before the first element and after the last element of the optical code along a predetermined direction, or also from the dimension of one element in a direction orthogonal to the development direction of the code.

Throughout the present description and the following claims, the expression "quiet zone" is used to indicate a white portion of predetermined width arranged before the beginning and after the end of the sequence of code elements and usually extended starting from such end elements up to the edge of the frame that includes said sequence of elements.

Preferably, said optical code belongs to a predetermined symbology and said at least one reference physical dimension is determined on the basis of said predetermined symbology.

The Applicant has advantageously observed that the number of characters of an optical code may be uniquely given, or reduced to a limited number of possibilities, by the particular type of symbology used. Once the symbology has been known, it is therefore possible to determine the physical dimension of the optical code.

In preferred embodiments of the present invention, the step of determining the position of the first significant contrast variation along said at least one predetermined direction is repeated more times along parallel paths. Such operation is advantageous for validating the results obtained.

Said step preferably includes, moreover, the step of travelling through said at least one predetermined direction along two opposite directions.

Preferably, the step of determining the position of said at least one portion of said at least one object comprises the steps of:
detecting the instant at which said at least one object travels through a predetermined detection position;
determining the displacement of said at least one object along the advancing direction.

Preferably, the step of determining the displacement of said at least one object comprises the steps of:
comparing the position of said at least one portion of said at least one image in at least two acquisitions;
calculating the displacement of said at least one object on the basis of said comparison.

The two above-mentioned acquisitions need not necessarily be consecutive.

As an alternative, a conventional encoder associated with the conveyor belt may be used, as in the system shown in FIG. 2. Of course, in those cases where the conveyor belt moves at a constant speed, it is not necessary to determine the movement of the object along the advancing direction, since such displacement is known in advance.

In a preferred embodiment thereof, the method of the present invention further comprises the step of detecting the distance of said at least one object by a specific distance measuring device distinct from the camera.

Such solution is particularly advantageous in those cases when there is uncertainty in the code-object association due to the fact that the coded information is in the proximity of the object edges and/or objects arranged very close to each other travel through the field of view of the camera (such as for example in the case shown in FIGS. 1A and 1B). In that case, the code-object association is made on the basis of the comparison between the object distance information coming from said distance measuring device and the distance information of the coded information with respect to the camera. Said distance measuring device therefore acts as an auxiliary device for reducing the uncertainty in the code-object association.

In particularly preferred embodiments thereof, the method of the present invention further comprises the following steps:
determining the position of said at least one object along two orthogonal directions within said at least one image;
determining the footprint of said at least one object in a plane with respect to said predetermined reference system on the basis of the position of said at least one object along said two orthogonal directions and of said distance.

Even more preferably, the method of the present invention further comprises the step of determining the volume of said at least one object on the basis of said footprint and of said distance.

In this way, advantageously, all the object dimensions are determined and thus, the position of the object in the fixed reference system is uniquely determined. Accordingly, once the position of each camera with respect to the other ones and to the fixed reference system is known, also the relative position between object and any other cameras of the optical identification system is uniquely determined. Each camera may therefore communicate the information acquired to the other cameras, thus allowing the problem of the code-object association to be solved in any case, even in those cases in which this problem cannot be solved with a single camera and requires the intervention of the other cameras.

In a particularly preferred embodiment of the present invention, at least two distinct cameras are used, wherein at least one camera is positioned so as to frame said at least one object from above the object and at least another camera is positioned so as to frame said at least one object from one of the sides thereof. Preferably, at least one of said cameras is positioned on at least one side of the conveyor belt on which the objects are arranged, so as to frame at least one between the right and left side faces of the objects. However, alternative embodiments are not excluded wherein said camera or at least one further camera is positioned in front or back position with respect to said conveyor belt, so as to frame at least one between the front and back faces of the objects.

In particularly preferred embodiments of the present invention, said at least one camera and, if present, said at least one distinct camera, is arranged so that its optical axis is perpendicular to said advancing direction.

In that case, preferably, said at least one image is acquired by said at least one camera when said at least one object is at said optical axis.

Advantageously, the choice of the particular position described above for the image acquisition allows reducing the possibilities of error in the code-objects association in those situations in which the objects are arranged as shown in FIGS. 1A and 1B, thanks to the minimisation of any relative darkening effect among the objects, and to the maximisation of the probability that the framed object is the one of interest. Moreover, any possible error caused by perspective deformations is prevented.

Preferably, the method of the present invention further comprises the steps of:
  determining the distance of a plurality of points of said at least one surface portion;
  determining a possible rotation angle between the optical axis of said at least one camera and the surface portion on the basis of the distance of said plurality of points.

It is therefore possible to determine the aforementioned reference physical dimension also in the presence of objects or coded information which are rotated about the optical axis of the camera and with the camera arranged at the side, front or back of the conveyor belt, in those cases wherein the coded information is on a face of the object other than the upper or lower one.

Preferably, the distance of said plurality of points is determined on the basis of the analysis of a perspective deformation of said at least one coded information.

In this way it is possible to determine the aforementioned reference physical dimension also in the presence of coded information arranged in a rotated position on one of the object faces.

More preferably, said optional angle of rotation is determined on the basis of the analysis of said footprint.

BRIEF DESCRIPTION OF THE DRAWINGS

Further characteristics and advantages of the present invention will appear more clearly from the following detailed description of a preferred embodiment thereof, made by way of a non-limiting example with reference to the attached drawings. In such drawings:

FIG. 6b shows an image of the coded information that may be detected by the system of FIG. 6a;

FIG. 7b shows an image of the coded information that may be detected by the system of FIG. 7a;

FIG. 8b shows an image of the coded information that may be detected by the system of FIG. 8a.

DETAILED DESCRIPTION

Figure 3:
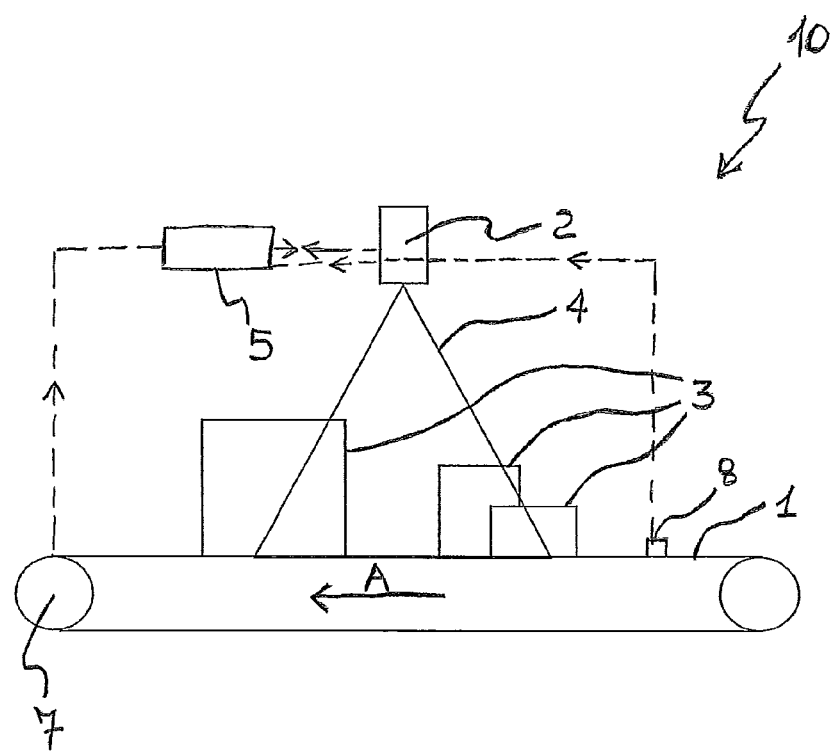
FIG. 3 is a schematic view of one of the preferred embodiments of an object identification system that carries out the method of the present invention.

In FIG. 3, reference numeral 10 indicates an object identification system that carries out a first preferred embodiment of the method of the present invention.

System 10 comprises a conveyor belt 1 which moves a plurality of objects 3 along an advancing direction A with respect to a digital camera 2, each object being provided with an optical code (not visible) on the top face thereof, such an optical code having a predetermined optical resolution.

The camera 2 is arranged in a predetermined position with respect to the conveyor belt 1. In particular, it is arranged above the conveyor belt 1 and frames a detection area 4 shaped as a pyramid through which objects 3 travel.

Preferably, as shown, the camera 2 is arranged with its optical axis perpendicular to conveyor belt 1 and acquires images when objects 3 travel at said optical axis.

As shown, at least some of objects 3 are at least partly arranged side by side with reference to said advancing direction A.

A processing unit 5, connected to the camera 2, is capable of decoding the optical codes associated with objects 3 when these are within the detection area 4. Such unit may also be incorporated into the camera 2.

The camera 2 comprises an imaging sensor (not visible) having a predetermined magnification ratio and a predetermined optical resolution. Camera 2 may also incorporate a variable magnification system whose magnification ratio at the time of the acquisition is known, as described above.

The predetermined magnification ratio and the predetermined optical resolution are previously set on the processing unit 5, along with a reference physical dimension taken on the surface of the optical code and linked to its resolution and/or to the type of symbology used for the optical coding of the optical code. Such dimension may be a single value corresponding to an expected resolution or a limited range of values.

Through the presence of an entry sensor 8 arranged in the proximity of conveyor belt 1 upstream of the detection area 4 with reference to the advancing direction A, camera 2 detects the entry of a plurality of objects 3 within the detection area 4 and, on the basis of the knowledge of the advancing speed of the conveyor belt 1 (known in advance if such speed is constant, or determined by the use of an encoder if such speed is not constant), it allows the processing unit 5 to synchronise the repeated acquisition of image sequences by the camera 2 with the instant of entry of each object 3 within the detection area 4.

The processing unit 5 is further capable of determining, through the camera 2, the position of each optical code and of each object 3 in a reference plane parallel to the top surface of the conveyor belt 1.

As shall be better described hereinafter, according to the present invention, knowing the optical resolution of the optical codes, the symbology they belong to and the magnification ratio of the imaging sensor of the camera 2, from the analysis of a single image acquired by the camera the processing unit 5 is capable of determining the distance of the optical codes from the camera 2.

Combining this distance information with the information relating to the position of each optical code in said reference plane, the processing unit 5 is capable of determining the position of the optical code along the advancing direction A with respect to a predetermined reference system.

Such position is compared with that of objects 3 so as to associate the optical code read with that specific object 3 which, at the time of the image acquisition by the camera 2, has a corresponding position.

The position of objects 3 along the advancing direction A is known once the instant at which each object travels at a predetermined detection position (which may precede the detection area 4 or be within the latter) has been detected and when the advancing speed of conveyor belt 1 is known.

Such speed may be deemed as constant (and thus known in advance) or, if it is variable, measured in real time, as described above.

In the embodiment shown in FIG. 3, the measurement of the advancing speed of the objects (and thus of the temporal position thereof) is directly carried out by the processing unit 5 through the camera 2 and on the basis of the analysis of the displacement of any article framed (for example the optical code or an object 3) in two subsequent acquisitions.

In particular, this measurement may be obtained by analysing only a portion of the image each time acquired, so as to reduce the processing times. This is possible thanks to the capability of some sensors of acquiring and transmitting a signal generated by just a part of the total pixels of the image acquired, for example only a line parallel to the scanning direction, or only a window of reduced dimensions (this capability is known by the term: windowing, or sensor windowing).

In a preferred embodiment of the present invention, the information that links the displacement of the image portion analysed to the advancing speed of conveyor belt 1 may be obtained by analysing the position of at least one portion of an element of the optical code (for example the bars and/or spaces of a barcode) within the image.

As an alternative, any sign or element of any geometrical shape arranged on the face itself of the object 3 or on the conveyor belt 1 may be used, provided that the dimensions thereof are known in advance.

Alternatively, once the distance has been determined, the displacement speed of a front (contrast variation) may be measured, which identifies the edge of the object or of the optical code (or of another optional sign or element) on a sequence of images acquired by camera 2. This measurement may be made in real time, correcting image after image, the detected speed value.

The technique for measuring the distance of the optical code according to the present invention shall now be described with particular reference to a linear optical code and to FIGS. 4a-4d, wherein reference numeral 30 indicates a barcode. What described hereinafter applies likewise to codes of different types too, such as for example a two-dimensional code, etc.

Code 30 comprises a plurality of elements (all indicated with B and, in the specific case illustrated herein, defined by bars and spaces) that follow one another along a predetermined horizontal direction O.

Figure 4A:
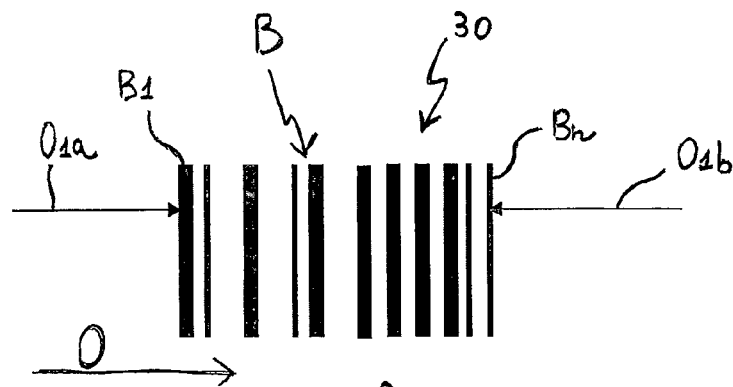
FIGS. 4a-4d show various exemplary applications of a technique carried out in one of the embodiments of the method of the present invention.
Figure 4B:
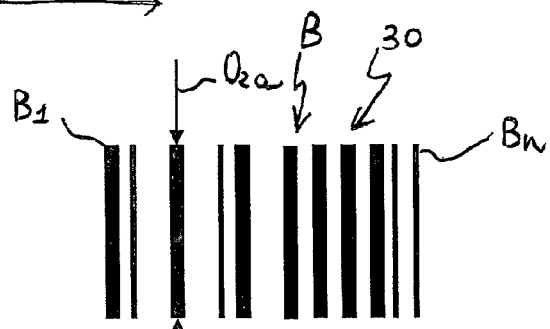
Figure 4C:
Figure 4D:
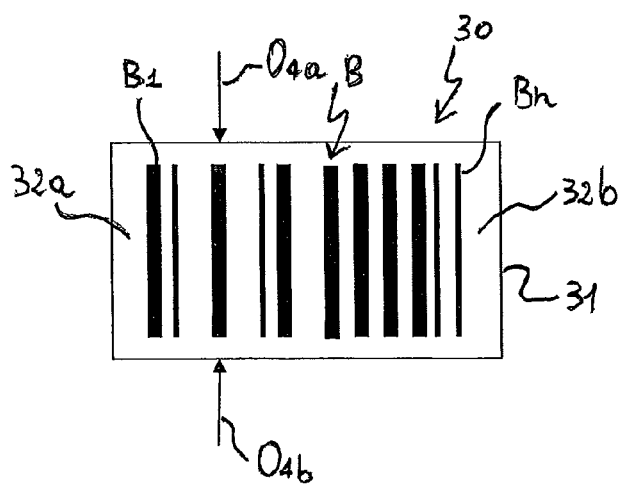

Unlike FIGS. 4a and 4b, code 30 of FIGS. 4c and 4d comprises a frame 31 that defines a quiet zone 32a on the left of the first element B1 and a quiet zone 32b on the right of the last element Bn.

According to the present invention and as already anticipated above, the measurement of the distance of code 30 from camera 2 is carried out using the code 30 itself, once its optical resolution, magnification ratio of the imaging sensor mounted in camera 2 (such magnification ratio being known at least at the time of the acquisition of the relevant image) and optionally the symbology the optical code belongs to, are known. If the optical resolution is variable, it preferably varies by ±15%, more preferably by ±5% with respect to a predetermined reference value.

The distance measurement in particular envisages an analysis of code 30 through a plurality of parallel linear paths, horizontal or vertical, searching for the position of the first significant contrast variation.

In the specific example shown in FIG. 4a, a first horizontal path O1a is made from left to right and preferably also an opposite path O1b from right to left. The first significant contrast variation will in this case be detected at the first element B1 and at the last element Bn, respectively.

As an alternative, as shown in the specific example shown in FIG. 4b, a first vertical path O2a is made from the top to the bottom and preferably also an opposite path O2b from the bottom to the top. The first significant contrast variation will in this case be detected at any element B of code 30, respectively. In this case, it is important to repeat the analysis by making multiple vertical paths until a bar of code 30 is intercepted.

As an alternative, as shown in the specific example shown in FIG. 4c, a first horizontal path O3a is made from left to right and preferably also an opposite path O3b from right to left. The first significant contrast variation will in this case be detected at a vertical side of frame and at the opposite vertical side of said frame, respectively.

As an alternative, as shown in the specific example shown in FIG. 4d, a first path O4a is made from the top to the bottom and preferably also an opposite path O4b from the bottom to the top. The first significant contrast variation will in this case be respectively detected at a horizontal side of frame 31 and of the opposite horizontal side of said frame.

Once the position of the first significant contrast variation in at least one of the two opposite paths has been detected according to one of the methods shown in FIGS. 4a-4d, it is possible to calculate the number of image pixels occupied by code 30. This data represents the dimension of code 30 in terms of pixels at distance D in the image plane (hereinafter also "Pixels occupied at D").

The geometrical distance D of code 30 from camera 2 may be obtained applying the formula:

$$D = \text{Code-camera distance} = \frac{\text{Pixel occupied at } D\text{max/Sensor Resolution}}{\text{Pixel occupied at } D/\text{Sensor Resolution}} * D\text{max}$$

wherein Dmax is the distance between camera 2 and conveyor belt 1 (previously set in the processing unit 5).

Knowing the optical resolution of the particular type of sensor mounted in camera 2, camera 2 frames at distance Dmax a rectangle with sides LA and LB, wherein the dimensions of sides LA and LB are known. The ratio between the number of pixels occupied at distance Dmax from the code and the sensor resolution may therefore be obtained from ratio So/LA or Sv/LB (depending on whether code 30 is being analysed along a horizontal or a vertical direction), where So is the horizontal dimension of code 30 and Sv is the vertical dimension of code 30. Dimensions So and Sv are previously set in the processing unit 5 since substantially constant or obtainable on the basis of the number of elements B of the code upon reading the optical code (if such number is variable), knowing also the symbology used and/or measuring the dimension of the single element of the code along the direction in which the various elements of the code itself follow one another.

In the case of two-dimensional codes, or more in general of codes that extend along two parallel directions, the technique described above may be repeated along at least one horizontal direction or at least one vertical direction.

In order to validate the results obtained with the search technique described above it is preferable to repeat said technique by a plurality of horizontal and/or vertical parallel paths.

A different embodiment of the method of the present description is described hereinafter with reference to FIG. 5, which as an alternative to the embodiments described above may be used if objects 3 are arranged on conveyor belt 1 so as to be spaced from each other with reference to the advancing direction A.

Such embodiment differs from the one described above with reference to FIG. 3 in that the determination of the distance of each object 3 from the camera does not necessarily require the prior detection of a coded information. In fact, the distance may be determined starting from the maximum size of object 3 along the advancing direction A. Such maximum size is determined on the basis of the displacement of object 3 along the advancing direction A, as described in detail hereinafter.

As shown, also in this case the object identification system 10 comprises a conveyor belt 1 on which objects 3 are arranged, at least one camera (not visible), the presence sensor 8 and the encoder 7. Of course, if the advancing speed of conveyor belt 1 is constant, using the encoder 7 is not required.

As in the embodiment shown in FIG. 3, also in this case for simplicity of explanation it is considered that the camera is arranged above the conveyor belt 1.

The encoder 7 and the presence sensor 8, if provided, are both connected to a motion control unit (not shown) provided with an incremental counter. Such motion control unit may be incorporated in the camera or be a unit separate from the latter.

The determination of the displacement of objects 3 along the advancing direction A occurs through a suitable detection of the signals provided by the presence sensor 8 and by the encoder 7, as described hereinafter.

Figure 5A:
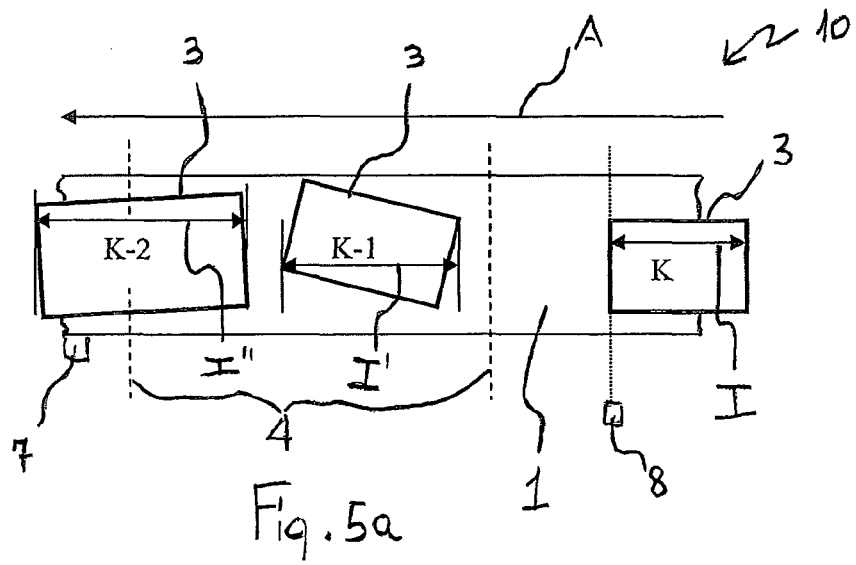
FIG. 5a is a schematic top view of a possible operating configuration of the system that carries out the method of the present invention.

In the specific example illustrated in FIG. 5*a*, three rectangular objects 3 respectively identified with K, K−1 and K−2 are shown. Object K is aligned with the advancing direction A and is shown in the position in which, during the displacement thereof along the advancing direction A, it has reached the presence sensor 8, which has been activated in advance. At an instant, which may be coincident with or subsequent to the instant of reaching the sensor 8, the camera detects a significant contrast variation and stores the value of the incremental counter of the encoder 7 at this instant (first value). When the back of object K has passed the presence sensor 8, at an instant, which may be coincident with or subsequent to the instant of passing the sensor 8, the camera detects a new significant contrast variation and stores the value of the incremental counter at this instant (second value).

The difference between the second value and the first value represents the differential of the encoder 7, which depends on the maximum size of object 3 along the advancing direction A, which in the specific case of object K corresponds to its length (indicated with I in the figure). In particular, said maximum size may be determined by multiplying the differential of the encoder 7 by the unit pitch of the encoder.

The same steps described above may be applied to objects K−1 and and K−2. In these cases, the maximum size of the two objects determined as described above does not represent the length of the respective objects but the projection of the respective lengths along the advancing direction A (respectively indicated with I' and I").

Proceeding as described above it is possible to assign to each object 3 a respective maximum size, which is suitably stored.

As shown in FIG. 5*a*, the displacement of objects 3 (and thus the maximum size thereof) is preferably determined at a presence sensor 8 which is arranged in an observation area that precedes the detection area 4 framed by the camera. Alternative embodiments are in any case envisaged wherein said observation area coincides or is at least partly overlapped to the detection area 4.

Figure 5B:
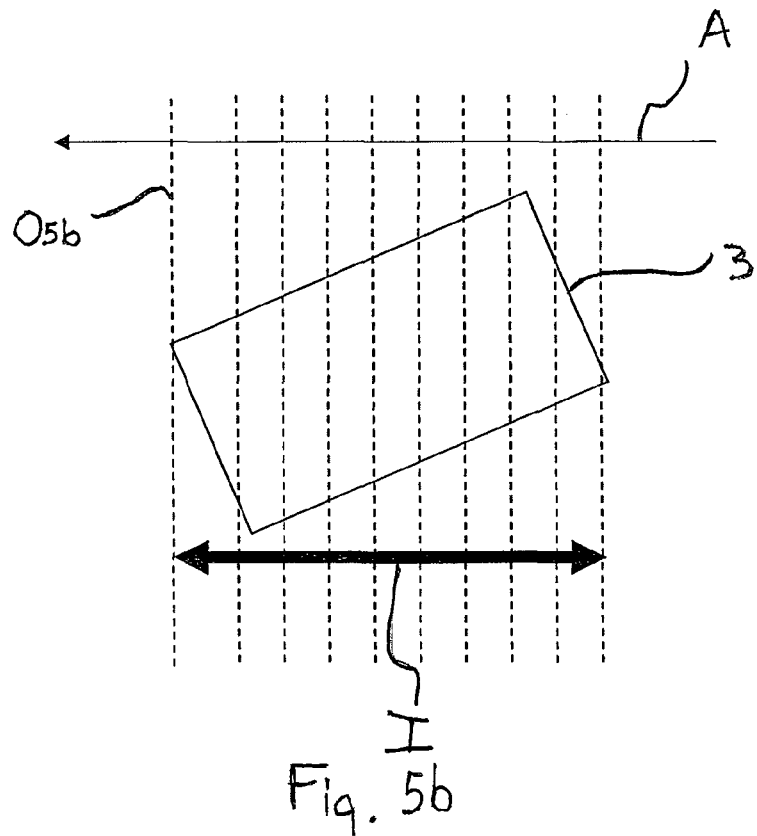
FIG. 5b shows an exemplary application of a further technique carried out in one of the embodiments of the method of the present invention.

After a predetermined number of unit encoder steps, each object 3 reaches the detection area 4. The camera preferably acquires the image when object 3 is at the optical axis of the camera. The first significant contrast variation and, preferably, the last significant contrast variation along the advancing direction A are identified through image processing techniques. One of above-mentioned techniques provides for tracing a plurality of parallel lines O5b all perpendicular to the advancing direction A, as shown in FIG. 5*b* and measuring the number of pixels in the image that space the two extreme parallel lines. The overall size in pixels (indicated with I in FIG. 5*b*) of object 3 in the advancing direction A is thus determined.

By comparing the maximum size determined beforehand on the basis of the signals provided by the presence sensor 8 and by the encoder 7 with the size in pixels it is possible to determine the distance of object 3 from the camera.

As an alternative, the aforementioned reference physical dimension is a logo or a different graphic element of known dimension associated with object 3.

In all the embodiments described above, considering that the contrast between object 3 and conveyor belt 1 highlights the position, in the image acquired by the camera, of object 3 along two orthogonal directions, it is possible to determine the footprint in pixels of object 3 and, knowing the distance of object 3 from the camera, the footprint of object 3 in the fixed reference system. Based on this footprint and on the distance of the object from the camera, it is possible to determine the volume of object 3.

Figure 6A:
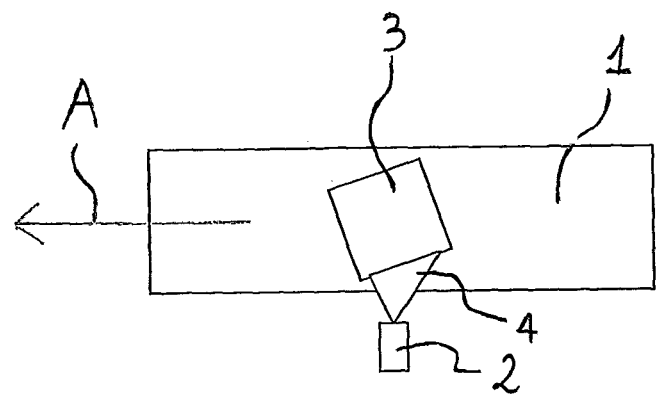
FIG. 6a is a schematic top view of a further possible operating configuration of the system that carries out the method of the present invention.
Figure 7A:
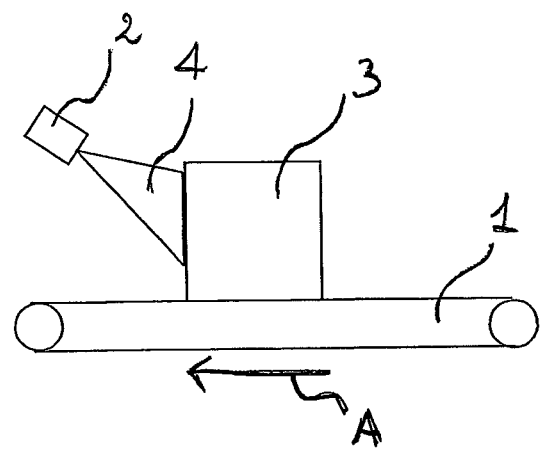
FIG. 7a is a schematic side view of a further possible operating configuration of the system that carries out the method of the present invention.
Figure 8A:
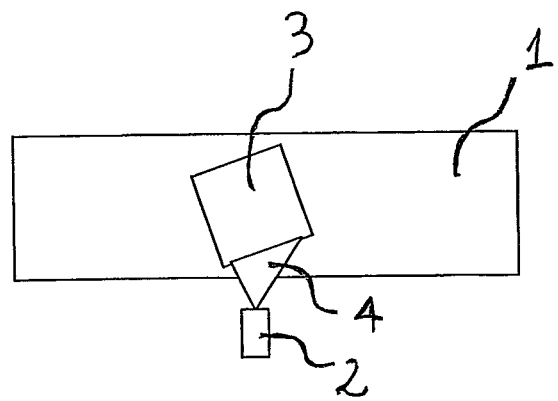
FIG. 8a is a schematic top view of a further possible operating configuration of the system that carries out the method of the present invention.

The techniques described above may be applied both to the cases where camera 2 frames objects 3 from the top (as shown in FIG. 3), and where camera 2 is arranged laterally (as shown in FIGS. 6*a* and 8*a*), frontally (as shown in FIG. 7*a*), or at the back with respect to objects 3, in order to capture optical codes arranged on any one of the object surfaces. In the case of a reading carried out on the bottom surface, the distance of the optical code from the camera is uniquely determined and corresponds to the distance between camera and conveyor belt.

The techniques described above, moreover, are applicable to the cases in which the optical codes lies on a plane not perfectly perpendicular to the optical axis of camera 2, as shown in FIGS. 6*a*, 7*a* and 8*a*. In these cases, the analysis of the optical code at multiple points allows detecting whether object 3 is or not rotated and on which side.

Figure 6B:
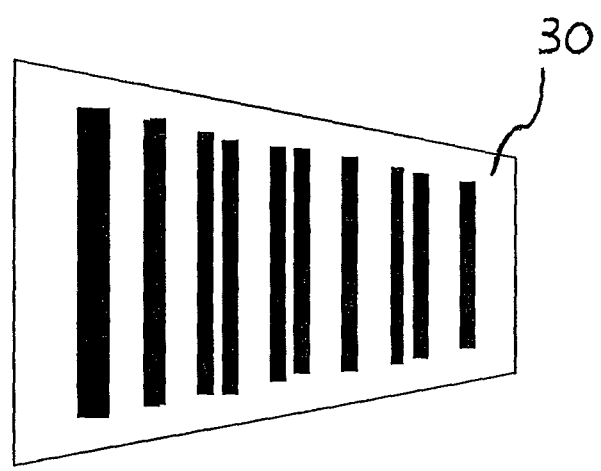

Let us consider for example a reading of a code arranged on a side face of an object 3 with reference to an advancing direction A that goes from right to left (FIG. 6a). Using one of the techniques described above it is possible to determine the distance of a plurality of points of said side face from camera 2. If, as shown in FIG. 6b, it is found that the physical dimension of the optical code 30 detected along a vertical path on the left is greater than the physical dimension detected along a vertical path on the right, object 3 will then be rotated with the front side towards camera 2. Indeed, the more camera 2 is approached, the more the area framed by the same decreases and the number of pixels occupied increases proportionally. This occurs provided that the top horizontal measurement coincides with the bottom horizontal measurement, that is, the plane on which the code lies is perpendicular to the conveyor belt.

In this case, the distance of the optical code 30 may be calculated by making an arithmetical average between the left vertical measurement and the right vertical measurement.

Figure 7B:
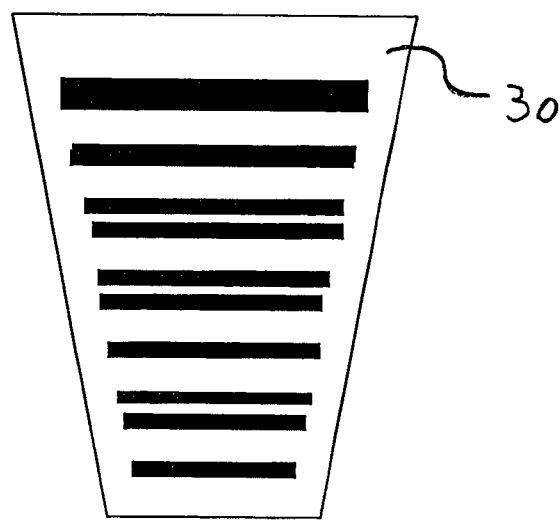

Likewise it is possible to calculate the code distance from the camera 2 when object 3 is not rotated with respect to the camera 2 and the code lies on a surface perpendicular to the advancing direction A (FIG. 7a). In this case, the distance of code 30 may be calculated by making an arithmetical average between the top horizontal measurement and the bottom horizontal measurement (FIG. 7b).

Figure 8B:
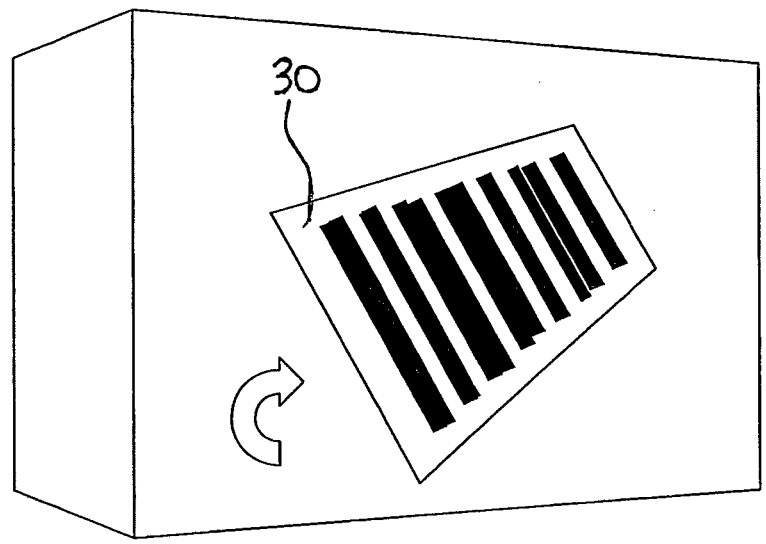

On the other hand, if code 30 is rotated in the plane on which it lies (FIGS. 8a and 8b), that is, the sides thereof are not parallel or perpendicular to the advancing direction A, the techniques described above allow determining the orientation of code 30, and optionally rotating the image in the plane so as to return to one of the previous cases.

In general, once the reference physical dimension has been determined in one of the ways described above, from the analysis of the footprint in pixels of object 3 (such footprint being optionally determined through a proper perspective deformation of object 3) and from the position thereof within the image it is possible, through even more complex geometrical transformations than a simple rotation, to obtain the orientation of object 3 with respect to the camera, and accordingly the overall distance thereof.

There may be situations in which there is uncertainty in the code-object association due to the presence of coded information in the proximity of the edges of object 3 and/or objects 3 very close to one another.

Figure 1A:
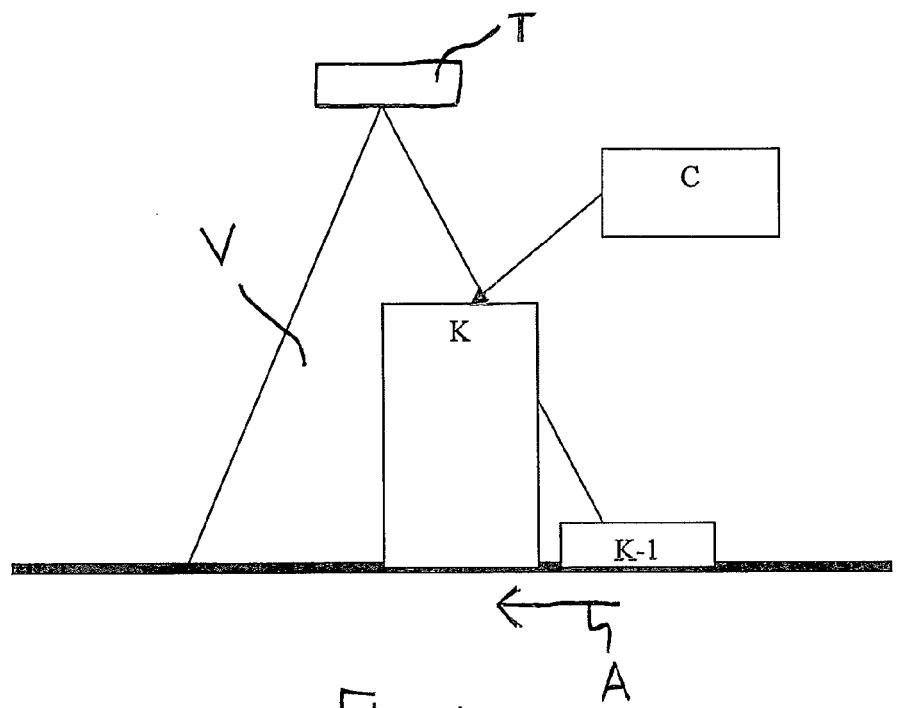
FIGS. 1A and 1B schematically illustrate a case wherein a camera detects the presence of two objects of potentially different heights within a field of view thereof.
Figure 1B:
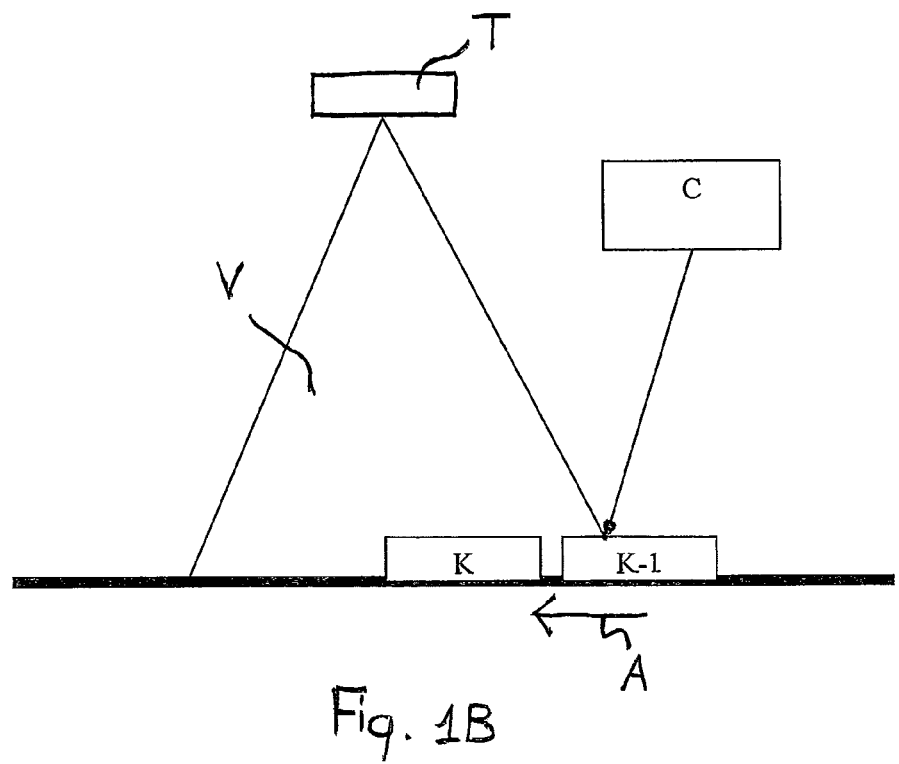
Figure 2:
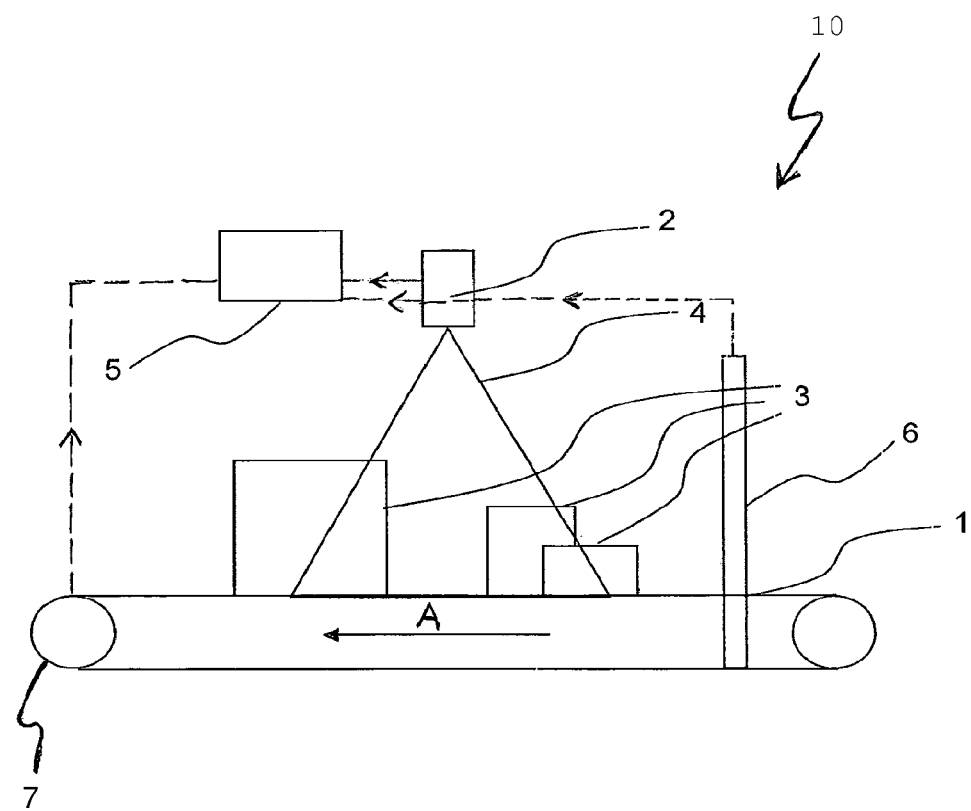
FIG. 2 illustrates a conveying system that uses digital cameras and a height detector.

In that case, preferably, the distance measurement techniques described above are combined with a distance signal detected by a proper distance measuring device arranged in the proximity of the conveyor belt 1 (such as for example the height measuring device 6 of FIG. 2).

In the practice, the code-object association is made in this case on the basis of the comparison between the height information of objects 3 coming from said distance measuring device and the measurement of the distance of the read code from the camera 2. If the distance measuring device signals an object 3 with height A1 whose passage begins at T11 and ends at T12, and camera 2, knowing the travelling time of a particular object 3 within the detection area 4, detects one or more codes at the same height within the corresponding zone of the detection area 4, then these codes are assigned to that object 3. If no codes are read in the presence of an "object presence" signal, this activates a "non identified object" signal, which may generate a particular action by the system.

As an alternative, all the codes contained in the image are read and, at the same time, all the "object entry" signals coming from the presence sensor are collected, after which a probabilistic code-to-object association is made using the highest amount of information available for such association to be as correct as possible.

In the preferred embodiments of system 10 described above, it is used at least one camera arranged above the conveyor belt 1 (as in FIG. 3) and at least one camera arranged on the side of the conveyor belt 1 (as in FIGS. 6a and 8a). A camera may also be provided in front of the conveyor belt 1 (as in FIG. 7a). The relative position of such cameras and the position of each one of them in the fixed reference system shall be known and can therefore be previously set in the system. The above-mentioned cameras may in this way exchange the information acquired so as to obtain a sufficient amount of information to proceed with a correct association between code and object.

It is clear that a man skilled in the art may make further changes and modifications to the invention described hereinbefore in order to meet specific and contingent application requirements, these changes and modifications in any case falling within the scope of protection defined by the following claims.

What is claimed is:

1. A method for the optical identification of objects in motion, comprising the following steps:

acquiring, by at least one camera having, at least during such an acquisition, a respective predetermined magnification ratio, at least one image of a predetermined detection area, said at least one image containing at least one portion of at least one object travelling through the detection area along a predetermined advancing direction;

determining the position of said at least one portion of said at least one object along the predetermined advancing direction with respect to a predetermined reference system;

detecting, in said at least one image or in at least one subsequent image containing said at least one portion of at least one object, at least one coded information travelling through the detection area along the predetermined advancing direction, said detection being carried out, respectively, by said at least one camera or by a distinct camera having a predetermined relative position with respect to said at least one camera and, at least during the acquisition of said at least one image or of said at least one subsequent image, a respective predetermined magnification ratio;

reading said at least one coded information;

determining the position of at least one portion of said at least one coded information along the predetermined advancing direction within the image;

detecting, by said at least one camera or said at least one distinct camera, at least one reference physical dimension belonging to at least one surface portion of said at least one object or of said at least one coded information within said image or said at least one subsequent image;

determining the distance of said at least one surface portion from said at least one camera and, if provided, from said at least one distinct camera on the basis of said at least one reference physical dimension and of the magnification ratio of the camera by which said at least one reference physical dimension has been detected;

determining the position of said at least one portion of coded information along the predetermined advancing direction with respect to the predetermined reference system on the basis of said distance and of the position of said at least one portion of said at least one coded information along the predetermined advancing direction within the image;

associating said at least one coded information with a respective object travelling through the detection area when said at least one coded information is detected, said association being made on the basis of said position of said at least one portion of said at least one object with respect to the predetermined reference system and of said position of said at least one portion of said at least one coded information with respect to the predetermined reference system, wherein the step of detecting at least one reference physical dimension comprises the steps of:
  determining the displacement of said at least one object along said advancing direction; and
  determining the maximum size of said at least one object along said advancing direction on the basis of said displacement, wherein said at least one camera and said at least one distinct camera each is a digital camera having a two-dimensional field of view.

2. The method according to claim 1, wherein the step of determining the maximum size of said at least one object along said advancing direction comprises the following steps:
  determining the position of a first significant contrast variation along said advancing direction within said at least one image;
  determining the number of pixels of said at least one image of said at least one camera occupied by said at least one object on the basis of the position of said first significant contrast variation.

3. The method according to claim 1, wherein said at least one image entirely contains said at least one object and the step of determining the maximum size of said at least one object along said advancing direction comprises the following steps:
  determining the position of a first significant contrast variation and of a last significant contrast variation along said advancing direction within said at least one image;
  determining the number of pixels of said at least One image occupied by said at least one object on the basis of the positions of said first significant contrast variation and said last significant contrast variation.

4. The method according to claim 1, wherein said at least one reference physical dimension is defined by a known dimension of a logo or different graphical element applied onto said at least one object.

5. The method according to claim 1, wherein the step of determining the position of said at least one portion of said at least one object comprises the steps of:
  detecting the instant at which said at least one object travels through a predetermined detection position;
  determining the displacement of said at least one object along said advancing direction.

6. The method according to claim 5, wherein the step of determining the displacement of said at least one object comprises the steps of:
  comparing the position of said at least one portion of said at least one image in at least two acquisitions;
  calculating the displacement of said at least one object on the basis of said comparison.

7. The method according to claim 1, further comprising the step of detecting the distance of said at least one object by a specific distance measuring device.

8. The method according to claim 1, further comprising the following steps:
  determining the position of said at least one object along two orthogonal directions within said at least one image;
  determining the footprint of said at least one object in a plane with respect to said predetermined reference system on the basis of the position of said at least one object along said two orthogonal directions and of said distance.

9. The method according to claim 8, further comprising the step of determining the volume of said at least one object on the basis of said footprint and of said distance.

10. The method according to claim 1, wherein said at least one camera is arranged so as to frame said at least one object from above the object and said at least one distinct camera is arranged so as to frame said at least one object from any of its sides.

11. The method according to claim 1, wherein said at least one camera and, if provided, said at least one distinct camera, is arranged so that its optical axis is orthogonal to said advancing direction.

12. The method according to claim 11, wherein said at least one image is acquired by said at least one camera when said at least one object is at said optical axis.

13. The method according to claim 12, comprising the steps of:
  determining the distance of a plurality of points of said at least one surface portion;
  determining a possible rotation angle between the optical axis of said at least one camera and the surface portion on the basis of the distance of said plurality of points.

14. The method according to claim 13, wherein the distance of said plurality of points is determined on the basis of the analysis of a perspective deformation of said at least one coded information.

15. The method according to claim 13, further comprising the following steps:
  determining the position of said at least one object along two orthogonal directions within said at least one image;
  determining the footprint of said a least one object in a plane with respect to said predetermined reference system on the basis of the position of said at least one object along said two orthogonal directions and of said distance;
wherein said possible rotation angle is determined on the basis of the analysis of said footprint.

16. A method for the optical identification of objects in motion, comprising the following steps:
  acquiring, by at least one camera having, at least during such an acquisition, a respective predetermined magnification ratio, at least one image of a predetermined detection area, said at least one image containing at least one portion of at least one object travelling through the detection area along a predetermined advancing direction;
  determining the position of said at least one portion of said at least one object along the predetermined advancing direction with respect to a predetermined reference system;
  detecting, in said at least one image or in at least one subsequent image containing said at least one portion of at least one object, at least one coded information travelling through the detection area along the predetermined advancing direction, said detection being carried out, respectively, by said at least one camera or by a distinct camera having a predetermined relative position with respect to said at least one camera and, at least during the acquisition of said at least one image or of said at least one subsequent image, a respective predetermined magnification ratio;
  reading said a least one coded information;

determining the position of at least one portion of said at least one coded information along the predetermined advancing direction within the image;

detecting, by said at least one camera or said at least one distinct camera, at least one reference physical dimension belonging to at least one surface portion of said at least one object or of said at least one coded information within said image or said at least one subsequent image;

determining the distance of said at least surface portion from said at least one camera and, if provided, from said at least one distinct camera on the basis of said at least one reference physical dimension and of the magnification ratio of the camera by which said at least one reference physical dimension has been detected;

determining the position of said at least one portion of coded information along the predetermined advancing direction with respect to the predetermined reference system on the basis of said distance and of the position of said at least one portion of said at least one information along the predetermined advancing direction within the image;

associating said at least one coded information with a respective object travelling through the detection area when said at least one coded information is detected, said association being made on the basis of said position of said at least one portion of said at least one object with respect to the predetermined reference system and of said position of said at least one portion of said at least one coded information with respect to the predetermined reference system, wherein said at least one reference physical dimension is defined by a known dimension of a logo or different graphical element applied onto said at least one object, wherein said at least one camera and said at least one distinct camera each is a digital camera having a two-dimensional field view.

17. A method for the optical identification of objects in motion, comprising the following steps:

acquiring, by at least one a having, at least during such an acquisition, a respective predetermined magnification ratio, at least one image of a predetermined detection area, said at least one image containing at least one portion of at least one object travelling through the detection area along a predetermined advancing direction;

determining the position of said at least one portion or said at least one object along the predetermined advancing direction with respect to a predetermined reference system;

detecting, in said at least one image or in at least one subsequent image containing said at least one portion of at least one object, at least one coded information travelling through the detection area along the predetermined advancing direction, said detection being carried out, respectively, by said at least one camera or by a distinct camera having predetermined relative position with respect to said at least one camera and, at least during the acquisition of said at least one image or of said at least one subsequent image, a respective predetermined magnification ratio;

reading said at least one coded information;

determining the position of at least portion of said at least one coded information along the predetermined advancing direction within the image;

detecting, by said at least one camera or said at least one distinct camera, at least one reference physical dimension belonging to at least one surface portion of said at least one object or of said at least one coded information;

determining the distance of said at least one surface portion from said at least one camera and, if provided, from said at least one distinct camera on the basis of said at least one reference physical dimension and of the magnification ratio of the camera by which said at least one reference physical dimension has been detected;

determining the position of said at least one portion of coded information along the predetermined advancing direction with respect to the predetermined reference system on the basis of said distance and of the position of said at least one portion of said at least one coded information along the predetermined advancing direction within the image;

associating said at least one coded information with a respective object travelling through the detection area when said at least one coded information is detected, said association being made on the basis of said position of said at least one portion of said at least one object with respect to the predetermined reference system and of said position of said at least one portion of said at least one coded information with respect to the predetermined reference system, wherein said at least one camera and, if provided, said at least one distinct camera, is arranged so that its optical axis is orthogonal to said advancing direction, wherein said at least one image is acquired by said at least one camera when said at least one object is at said optical axis;

wherein the method further comprises the steps of:
   determining the distance of a plurality of points of said at least one surface portion; and
   determining a possible rotation angle between the optical axis of said at least one camera and the surface portion on the basis of the distance of said plurality of points, wherein the distance of said plurality of points is determined on the basis of the analysis of a perspective deformation of said at least one coded information wherein said at least one camera and said at least one distinct camera each is a digital camera having a two-dimensional field of view.

18. A method for the optical identification of objects in motion, comprising the following steps:

acquiring, by at least one camera having, at least daring such an acquisition, a respective predetermined magnification ratio, at least one image of a predetermined detection area, said at least one image containing at least one portion of at least one object travelling through the detection area along a predetermined advancing direction;

determining the position of said at least one portion of said at least one object along the predetermined advancing direction with respect to a predetermined reference system;

detecting, in said at least one image or in at least one subsequent image containing said at least one portion of at least one object, at least one coded information travelling through the detection area along the predetermined advancing direction, said detection being carried out, respectively, by said at least one camera or by a distinct camera having a predetermined relative position with respect to said at least one camera and, at least during the acquisition of said at least one image or of said at least one subsequent image, a respective predetermined magnification ratio;

reading said at least one coded information;
determining the position of at least one portion of said at least one coded information along the predetermined advancing direction within the image;
detecting, by said at least one camera or said at least one distinct camera, at least one reference physical dimension belonging to at least one surface portion of said at least one object or of said at least one coded information within said image or said at least one subsequent image;
determining the distance of said at least one surface portion from said at least one camera and, if provided, from said at least one distinct camera on the basis of said at least one reference physical dimension and of the magnification ratio of the camera by which said at least one reference physical dimension has been detected;
determining the position of said at least one portion of coded information along the predetermined advancing direction with respect to the predetermined reference system on the basis of said distance and of the position of said at least one portion of said at least one coded information along the predetermined advancing direction within the image;
associating said at least one coded information with a respective object travelling through the detection area when said at least one coded information is detected, said association being made on the basis of said position of said at least one portion of said at least one object with respect to the predetermined reference system and of said position of said at least one portion of said at least one coded information with respect to the predetermined reference system,
wherein said at least one coded information has a predetermined optical resolution and wherein the step of detecting at least one reference physical dimension comprises the step of determining the physical dimension of said at least one coded information along at least one characteristic direction,
wherein said at least one coded information is a linear optical code and the step of determining the physical dimension of said at least one coded information comprises the step of measuring at least one element of said optical code along said at least one characteristic direction, and
wherein said optical code belongs to a predetermined symbology and said at least one reference physical dimension is determined on the basis of said predetermined symbology,
wherein said at least one camera and said at least one distinct camera each is a digital camera having a two-dimensional field of view.

19. The method according to claim 18, wherein the step of determining the physical dimension of said at least one coded information comprises the following steps:
determining the position of a first significant contrast variation along said at least one characteristic direction;
determining the number of pixels of said at least one image of said at least one camera or of said at least one distinct camera occupied by said coded information starting from the position of said first significant contrast variation and on the basis of said predetermined optical resolution.

* * * * *